United States Patent
Hirao et al.

(10) Patent No.: US 11,945,428 B2
(45) Date of Patent: Apr. 2, 2024

(54) VEHICLE MOTION CONTROL APPARATUS

(71) Applicant: Hitachi Astemo, Ltd., Ibaraki (JP)

(72) Inventors: Ryusuke Hirao, Hitachinaka (JP); Nobuyuki Ichimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/762,131

(22) PCT Filed: Aug. 27, 2020

(86) PCT No.: PCT/JP2020/032311
§ 371 (c)(1),
(2) Date: Mar. 21, 2022

(87) PCT Pub. No.: WO2021/059845
PCT Pub. Date: Apr. 1, 2021

(65) Prior Publication Data
US 2022/0388485 A1    Dec. 8, 2022

(30) Foreign Application Priority Data

Sep. 27, 2019 (JP) ................................ 2019-177675

(51) Int. Cl.
*B60T 8/1755* (2006.01)
*B60G 17/016* (2006.01)
(Continued)

(52) U.S. Cl.
CPC ...... *B60T 8/17554* (2013.01); *B60G 17/0162* (2013.01); *B60T 8/17551* (2013.01);
(Continued)

(58) Field of Classification Search
CPC ............. B60T 8/17554; B60T 8/17551; B60T 2230/03; B60T 2250/03; B60T 2220/03;
(Continued)

(56) References Cited

U.S. PATENT DOCUMENTS

2011/0246017 A1* 10/2011 Koto .................. B60T 8/17554
701/31.4
2013/0079988 A1    3/2013 Hirao et al.
(Continued)

FOREIGN PATENT DOCUMENTS

CN         104236928 A  * 12/2014
DE    102015224389 B4  *  2/2022 ............ B60W 10/20
(Continued)

OTHER PUBLICATIONS

International Search Report dated Oct. 27, 2020 in International Application No. PCT/JP2020/032311, with English Translation.
(Continued)

*Primary Examiner* — B M M Hannan
(74) *Attorney, Agent, or Firm* — Wenderoth, Lind & Ponack, L.L.P.

(57) ABSTRACT

In a vehicle, GV control and M+ control are executed by generating braking/driving forces from a brake hydraulic pressure control device and a drive device during steering. A controller estimates (calculates), by a posture estimation unit, a pitch amount and a roll amount (predicted pitch rate and predicted roll rate) that occur in the vehicle through use of a moment command of the M+ control and a longitudinal G command of the GV control. The controller adjusts damping forces of damping force variable dampers through use of the estimated pitch amount and the estimated roll amount (predicted pitch rate and predicted roll rate) so that a pitch amount calculated by a pitch control unit and a roll amount calculated by a roll suppression unit approach respective target values.

5 Claims, 4 Drawing Sheets

(51) Int. Cl.
| | |
|---|---|
| *B60W 10/18* | (2012.01) |
| *B60W 10/22* | (2006.01) |
| *B60W 30/04* | (2006.01) |
| *B60W 40/109* | (2012.01) |
| *B60W 40/11* | (2012.01) |
| *B60W 40/112* | (2012.01) |
| *B60W 40/114* | (2012.01) |

(52) U.S. Cl.
CPC ............ *B60W 10/18* (2013.01); *B60W 10/22* (2013.01); *B60W 30/04* (2013.01); *B60W 40/109* (2013.01); *B60W 40/11* (2013.01); *B60W 40/112* (2013.01); *B60W 40/114* (2013.01); *B60G 2400/0521* (2013.01); *B60G 2400/0522* (2013.01); *B60G 2400/0523* (2013.01); *B60G 2400/104* (2013.01); *B60G 2500/10* (2013.01); *B60G 2800/9124* (2013.01); *B60T 2230/03* (2013.01); *B60T 2250/03* (2013.01); *B60W 2520/125* (2013.01); *B60W 2520/14* (2013.01); *B60W 2520/16* (2013.01); *B60W 2520/18* (2013.01); *B60W 2710/18* (2013.01); *B60W 2710/226* (2013.01)

(58) Field of Classification Search
CPC ............... B60T 2260/06; B60T 8/1755; B60G 17/0162; B60G 2400/0521; B60G 2400/0522; B60G 2400/0523; B60G 2400/104; B60G 2500/10; B60G 2800/9124; B60G 2202/24; B60G 2202/312; B60G 17/0195; B60G 2400/204; B60G 2400/252; B60G 2400/41; B60G 2400/412; B60G 17/08; B60G 17/019; B60W 10/18; B60W 10/22; B60W 30/04; B60W 40/109; B60W 40/11; B60W 40/112; B60W 40/114; B60W 2520/125; B60W 2520/14; B60W 2520/16; B60W 2520/18; B60W 2710/18; B60W 2710/226; B60W 10/04; B60W 10/08; B60W 30/02; B60W 2710/08; B60W 10/20; Y02T 10/72

USPC .......................................................... 701/38
See application file for complete search history.

(56) References Cited

U.S. PATENT DOCUMENTS

| | | | |
|---|---|---|---|
| 2015/0239442 A1 | 8/2015 | Yamakado et al. | |
| 2017/0197485 A1 * | 7/2017 | Sohn | .................. B60G 17/0182 |

FOREIGN PATENT DOCUMENTS

| | | | | | |
|---|---|---|---|---|---|
| EP | 2826646 | A1 * | 1/2015 | ........... | B60G 17/016 |
| JP | 2541928 | | 10/1996 | | |
| JP | 2002114140 | A * | 4/2002 | .......... | B60T 8/17554 |
| JP | 2004066873 | A * | 3/2004 | ............ | B60T 8/1755 |
| JP | 2004066938 | A * | 3/2004 | .......... | B60T 8/17554 |
| JP | 2004268870 | A * | 9/2004 | ............ | B60T 8/1755 |
| JP | 2007022235 | A * | 2/2007 | | |
| JP | 4427964 | B2 * | 3/2010 | .......... | B60T 8/17554 |
| JP | 2013-71558 | | 4/2013 | | |
| JP | 2014-069766 | | 4/2014 | | |
| KR | 10-2009-0028250 | | 3/2009 | | |

OTHER PUBLICATIONS

Written Opinion of the International Searching Authority dated Oct. 27, 2020 in International Application No. PCT/JP2020/032311, With English Translation.
Office Action dated Dec. 13, 2023 in corresponding Korean Patent Application No. 10-2022-7004472, with Machine Translation.

* cited by examiner

VEHICLE MOTION CONTROL APPARATUS

TECHNICAL FIELD

The present disclosure relates to a vehicle motion control apparatus to be used for a vehicle such as an automobile.

BACKGROUND ART

For example, in Patent Literature 1, there is described a vehicle which executes G-Vectoring control (GV control) of generating substantially the same forces or braking forces on left wheels and right wheels of four wheels based on an acceleration/deceleration command value calculated based on a lateral jerk of the vehicle, to thereby control an acceleration/deceleration, and moment control (Moment+ control) of generating different driving forces or braking forces on the left wheels and the right wheels of the four wheels based on a vehicle yaw moment command value calculated based on the lateral jerk, to thereby control a yaw moment. In Patent Literature 2, there is described a vehicle motion control apparatus which controls damping force variable dampers in consideration of a pitch behavior of a vehicle, which occurs due to a command of the G-Vectoring control (GV control), to thereby simultaneously achieve roll control and a head-down pitch command.

CITATION LIST

Patent Literature

PTL 1: JP 2014-069766 A (JP 5970322 B2)
PTL 2: JP 2013-071558 A (JP 5809506 B2)

SUMMARY OF INVENTION

Technical Problem

The vehicle motion control apparatus as described in Patent Literature 2 controls the damping force variable dampers in consideration of the GV control which generates substantially the same driving forces or braking forces on left wheels and right wheels of four wheels during steering. However, in the vehicle motion control apparatus as described in Patent Literature 2, the moment control of generating different driving forces or braking forces on the left wheels and the right wheels during the steering is not taken into consideration. Consequently, for example, when the technology as described in Patent Literature 2 is used for a vehicle which executes the moment control, a change in roll posture may become excessively large or excessively small due to a roll moment caused by the moment control.

An object of one embodiment of the present invention is to provide a vehicle motion control apparatus capable of reducing promotion or suppression of a change in roll posture of a vehicle which controls a yaw moment.

Solution to Problem

According to one embodiment of the present invention, there is provided a vehicle motion control apparatus to be used for a vehicle, the vehicle including: a braking/driving force controller configured to adjust braking/driving forces when the vehicle is steered; and a plurality of force generation devices each of which is interposed between a vehicle body of the vehicle and one of a plurality of wheels, and is configured to adjust a force generated between the vehicle body and the one of the plurality of wheels, the vehicle motion control apparatus including a control unit configured to adjust the force of each of the plurality of force generation devices, wherein the control unit is configured to: calculate, from a turn state of the vehicle body, a target roll amount being a target; and estimate, based on a change rate of a lateral acceleration of the vehicle and a yaw moment command value for generating a yaw moment, a roll amount that occurs in the vehicle, and output, to each of the plurality of force generation devices, such a command value that the estimated roll amount approaches the target roll amount.

According to one embodiment of the present invention, promotion or suppression of a change in roll posture of the vehicle which controls the yaw moment can be reduced.

DESCRIPTION OF EMBODIMENTS

With reference to the accompanying drawings, description is now given of a vehicle motion control apparatus according to each embodiment of the present invention while exemplifying a case in which this vehicle motion control apparatus is mounted to a four-wheeled vehicle.

Figure 1:
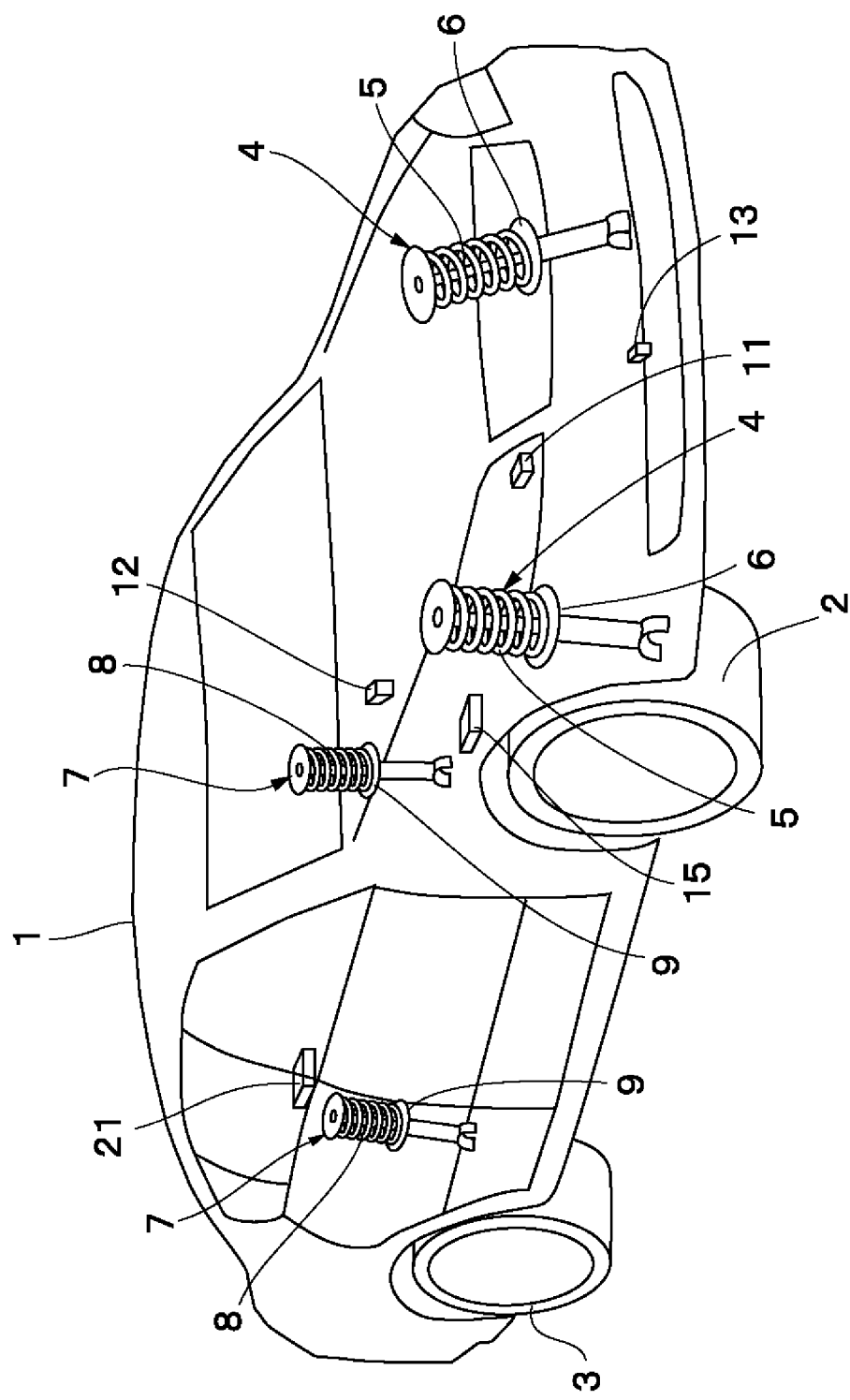
FIG. 1 is a perspective view for illustrating a four-wheeled vehicle on which a vehicle motion control apparatus according to embodiments of the present invention is mounted.
Figure 2:
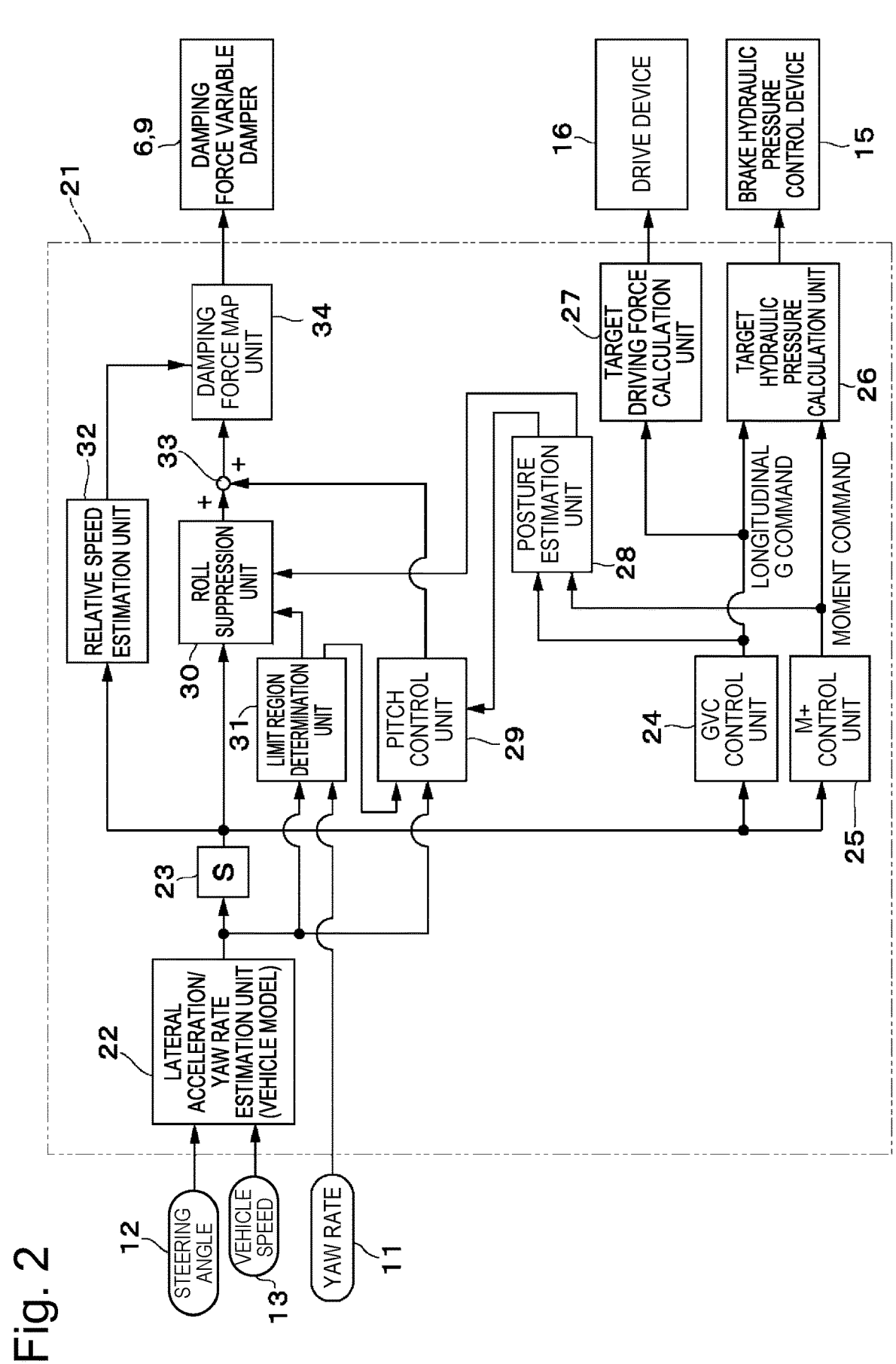
FIG. 2 is a control block diagram for illustrating the vehicle motion control apparatus according to a first embodiment of the present invention.
Figure 3:
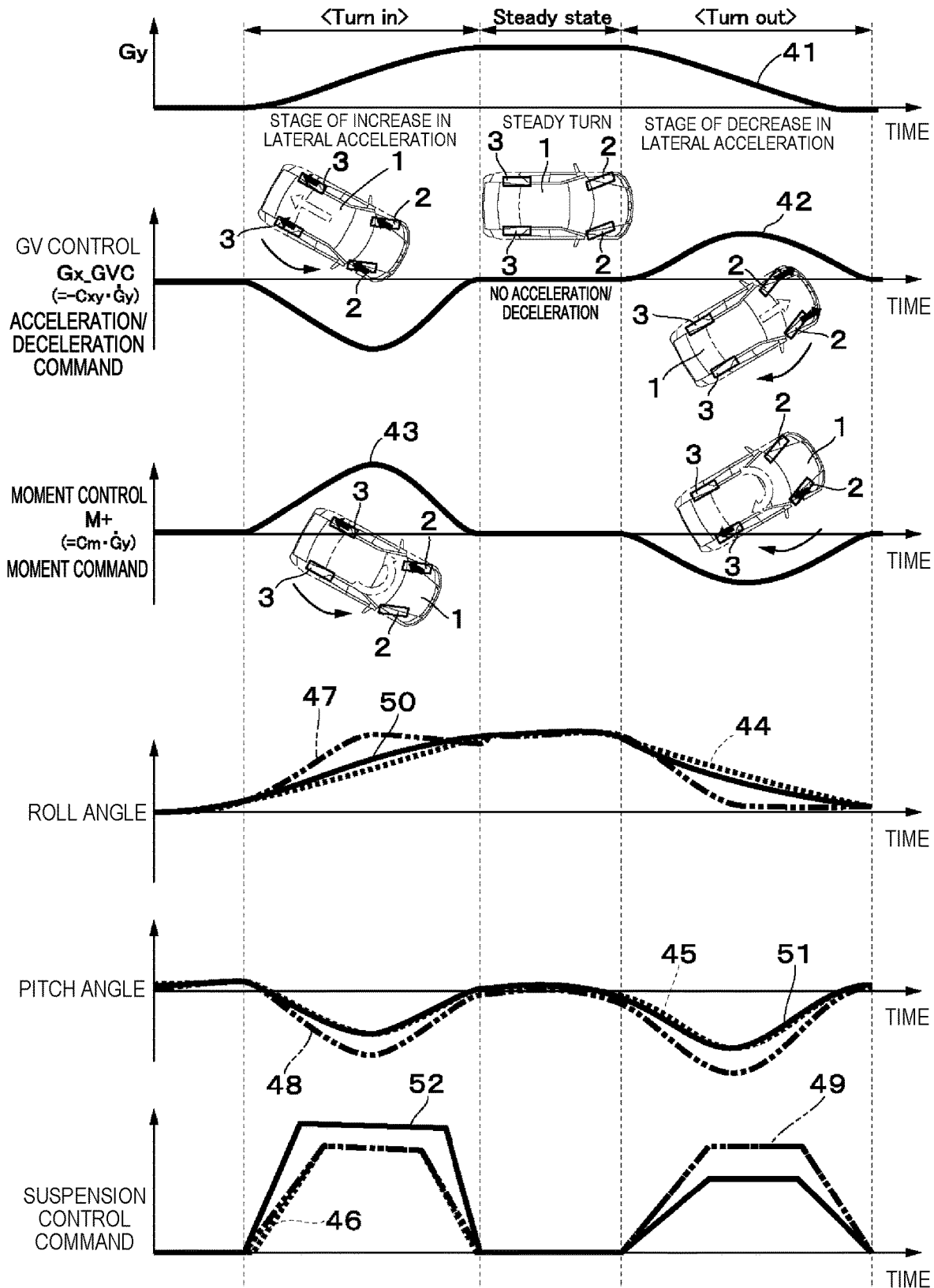
FIG. 3 is a characteristic graph for showing an example of temporal changes in a lateral acceleration (Gy), an acceleration/deceleration command (Gx_GVC), a moment command (M+), roll angles, pitch angles, and suspension control commands (damping force commands directed to damping force variable dampers).

In FIG. 1 to FIG. 3, a first embodiment of the present invention is shown. In FIG. 1, a vehicle body 1 forms a body of the vehicle. On a lower side of the vehicle body 1, for example, left and right front wheels 2 (also referred to as "wheels 2") and left and right rear wheels 3 (also referred to as "wheels 3") are installed. Between the vehicle body 1 and the plurality of wheels 2 and 3 of the vehicle, a plurality of damping force adjustable shock absorbers 6 and 9 are interposed, respectively.

More specifically, between the left and right front wheels 2 side and the vehicle body 1, suspension devices 4 and 4 on the front wheel side are interposed. Each suspension device 4 is formed of a left or right suspension spring 5 (hereinafter referred to as "spring 5") and the left or right damping force adjustable shock absorber 6 (hereinafter referred to as "damping force variable damper 6") installed, in parallel to each spring 5, between the left or right front wheel 2 side and the vehicle body 1. The damping force variable damper 6 forms a force generation device capable of adjusting a force generated between the vehicle body 1 and each wheel 2. The damping force variable dampers 6 form, together with a controller 21 described below, a suspension control device to be used for the vehicle.

Meanwhile, between the left and right rear wheels 3 side and the vehicle body 1, suspension devices 7 and 7 on the rear wheel side are interposed. Each suspension device 7 is formed of a left or right suspension spring 8 (hereinafter referred to as "spring 8") and the left or right damping force adjustable shock absorber 9 (hereinafter referred to as "damping force variable damper 9") installed, in parallel to each spring 8, between the left or right rear wheel 3 side and the vehicle body 1. The damping force variable damper 9 forms a force generation device capable of adjusting a force generated between the vehicle body 1 and each wheel 3. The damping force variable dampers 9 form, together with the controller 21 described below, the suspension control device to be used for the vehicle.

Each of the damping force variable dampers 6 and 9 of the suspension devices 4 and 7 is formed of a hydraulic shock absorber of a damping force adjustable type. To each of the damping force variable dampers 6 and 9, an actuator (not shown) formed of a damping force adjustment valve, a proportional solenoid, and the like is attached in order to continuously adjust a damping force characteristic thereof from a hard characteristic to a soft characteristic. It is not required that the actuator for the damping force adjustment be configured to continuously change the damping force characteristic, and the actuator may be configured to adjust the damping force characteristic stepwise at two steps or three steps. Moreover, the damping force variable dampers 6 and 9 are only required to switch the damping force, and may be, for example, pneumatic dampers or electromagnetic dampers (electric dampers).

That is, in the first embodiment, description is given by exemplifying semiactive suspensions including the damping force adjustable shock absorbers (damping force variable dampers 6 and 9) serving as the force generation devices, but, for example, semiactive suspensions including ER dampers (electrorheological fluid dampers), air suspensions including air springs (pneumatic actuators), hydraulic active suspensions including hydraulic actuators, or various cylinder devices (actuators) such as hydraulic stabilizer devices may be used. Moreover, electromagnetic suspension devices or electromagnetic stabilizer devices including electric actuators such as direct driven-type linear motors or rotary motors may be used. In short, as long as the force generation devices are devices capable of adjusting the forces generated between the vehicle body 1 and the wheels 2 and 3, various force generation devices may be used.

A yaw rate sensor 11 is installed on the vehicle body 1. The yaw rate sensor 11 detects, for example, a change (yaw rate) in a rotation direction that occurs about the center of gravity of the vehicle, and outputs a detection signal of the change to the controller 21. A steering angle sensor 12 is installed on the vehicle body 1. The steering angle sensor 12 detects a steering angle when a driver of the vehicle operates a steering wheel in a turn travel and the like, and outputs a detection signal of the steering angle to the controller 21. A vehicle speed sensor 13 detects, for example, the travel speed (vehicle speed) of the vehicle, and outputs a detection signal of the travel speed to the controller 21.

A brake hydraulic pressure control device 15 is mounted to the vehicle body 1. The brake hydraulic pressure control device 15 forms, together with a GVC control unit 24, an M+ control unit 25, a target hydraulic pressure calculation unit 26 (for any thereof, see FIG. 2), and the like of the controller 21 described below, braking force control means for generating braking forces when the vehicle is steered. The brake hydraulic pressure control device 15 generates brake hydraulic pressures in accordance with, for example, an operation on a brake pedal by the driver of the vehicle and a control signal (braking signal) from the controller 21, and executes control of increasing, holding, or reducing the brake hydraulic pressures.

A wheel cylinder (not shown) formed of a disc brake or the like is installed on the side of each of the front wheels 2 and the side of each of the rear wheels 3. When the brake hydraulic pressure variably controlled by the brake hydraulic pressure control device 15 is supplied to the wheel cylinder, the wheel cylinder applies a braking force to the corresponding wheel (any one of the front wheels 2 and the rear wheels 3), to thereby execute deceleration control for each of the wheels 2 and 3. The brake hydraulic pressure control device 15 is formed of, for example, a hydraulic pressure supply device (ESC) which supplies the brake hydraulic pressure to the wheel cylinder of each of the wheels 2 and 3.

In this embodiment, the hydraulic pressure brake device which generates the braking forces through the hydraulic pressure is exemplified as the brake device which applies the braking forces to the vehicle, but, for example, an electric brake device which generates the braking forces through electric motors may be used. In this case, the brake hydraulic pressure control device 15 corresponds to a brake force control device, and the target hydraulic pressure calculation unit 26 corresponds to a target braking force calculation unit which obtains a target braking force corresponding to a control current of each electric motor.

A drive device 16 (illustrated in only FIG. 2) is mounted to the vehicle body 1. The drive device 16 forms, together with the GVC control unit 24, a target driving force calculation unit 27 (for any thereof, see FIG. 2), and the like of the controller 21 described below, driving force control means for generating driving forces when the vehicle is steered. The drive device 16 generates a driving force on the side of each of the front wheels 2 in accordance with, for example, an operation on an accelerator pedal by the driver of the vehicle and a control signal (drive signal) from the controller 21, to thereby execute acceleration control. The drive device 16 is formed of a prime mover which drives the wheels, such as an engine of the vehicle or an electric motor for travel. In this embodiment, the vehicle is, for example, a front-wheel drive vehicle in which the front wheels 2 and 2 are driven wheels. Moreover, the brake hydraulic pressure control device 15 and the drive device 16 form, together with the controller 21, braking/driving force control means (braking force control means and/or driving force control means) for generating braking/driving forces (at least one of the braking forces or the driving forces) during the steering of the vehicle. That is, the vehicle includes the braking/driving force control means (at least one of the braking force control means or the driving force control means). Moreover, the controller 21 forms a braking/driving force controller (braking force controller and/or driving force controller) which adjusts the braking/driving forces (at least one of the braking forces or the driving forces) when the vehicle is steered. That is, the vehicle includes the braking/driving force controller (at least one of the braking force controller or the driving force controller).

In this case, the brake hydraulic pressure control device 15 and the drive device 16 generate substantially the same driving forces or braking forces on the left and right wheels 2 and 3 of the four wheels (front wheels 2 and rear wheels 3) based on a longitudinal G command (that is, an acceleration/deceleration command value calculated based on a lateral jerk of the vehicle) output from the GVC control unit 24 described below, to thereby execute G-Vectoring control (GV control) of controlling the acceleration/deceleration of the vehicle. Moreover, the brake hydraulic pressure control device 15 generates different driving forces or braking forces on the left and right wheels 2 and 3 of the four wheels (front wheels 2 and rear wheels 3) based on a moment command (that is, a vehicle yaw moment suppression command value calculated based on the lateral jerk) output from the M+ control unit 25 described below, to thereby execute moment control (Moment+ control, M+ control, or yaw moment control) of controlling the yaw moment of the vehicle. That is, in this embodiment, as shown in FIG. 3, the GV control and the moment control are executed in response to the change in lateral acceleration when the vehicle turns.

The controller 21 is formed of, for example, a microcomputer including an arithmetic processing device (CPU), a storage device (memory), and the like. The controller 21 forms, together with the brake hydraulic pressure control device 15 and the drive device 16, the braking/driving force control means for generating the braking/driving forces when the vehicle is steered. The controller 21 corresponds to a braking/driving force controller which adjusts the braking/driving forces when the vehicle is steered. Moreover, the controller 21 forms a vehicle motion control apparatus including a control unit (damping force adjustment control unit) which adjusts the force of each of the damping force variable dampers 6 and 9. The controller 21 controls the brake hydraulic pressure control device 15 and/or the drive device 16 based on the longitudinal G command (acceleration/deceleration command value) calculated based on the lateral jerk of the vehicle, to thereby execute the GV control. That is, the controller 21 calculates the acceleration/deceleration command value (longitudinal G command) based on the change rate (lateral jerk) of the lateral acceleration of the vehicle, and uses the acceleration/deceleration command value to generate the braking/driving forces by the brake hydraulic pressure control device 15 and/or the drive device 16, to thereby generate the acceleration/deceleration on the vehicle.

Moreover, the controller 21 uses the yaw moment command value calculated based on the lateral jerk to control the brake hydraulic pressure control device 15, to thereby execute the moment control. That is, the controller 21 calculates the yaw moment command value (moment command) based on the change rate (lateral jerk) of the lateral acceleration of the vehicle, and uses the yaw moment command value to generate the braking forces by the brake hydraulic pressure control device 15, to thereby generate the yaw moment on the vehicle. When the drive device 16 mounted to the vehicle has a configuration including a driving force distribution device such as an electromagnetic clutch capable of generating different driving forces on the left wheel and right wheel, different driving forces may be generated on the left and right wheels through the yaw moment command value, to thereby generate the yaw moment on the vehicle.

Incidentally, the vehicle motion control apparatus as described in Patent Literature 2 controls the damping force variable dampers in consideration of the GV control which generates substantially the same driving forces or braking forces on the left and right wheels of the four wheels during the steering. However, in the vehicle motion control apparatus as described in Patent Literature 2, the moment control of generating different driving forces or braking forces on the left and right wheels during the steering is not taken into consideration. Consequently, for example, when the technology disclosed in Patent Literature 2 is used for a vehicle which executes the moment control or a vehicle which executes the moment control and the GV control, a change in roll posture may be excessively large or excessively small due to the roll moment generated in the vehicle due to the moment control. As a result, the posture change of the vehicle becomes larger, and the driver and occupants may feel a sense of discomfort.

That is, the moment control generates the different driving forces or braking forces on the left and right wheels (for example, generates a driving force or a braking force on one wheel), to thereby control the yaw moment of the vehicle. However, the roll moment caused by the moment control may unnecessarily promote or suppress the roll. Thus, in this embodiment, the forces of the force generation devices (damping force variable dampers 6 and 9) are independently adjusted in response to the moment control. More specifically, in this embodiment, suspension control commands are increased or reduced independently for the four wheels in accordance with a value through FF control corresponding to the control commands of the moment control and the GV control. Accordingly, the promotion or the suppression of the roll caused by the moment control is canceled to provide a consistent vehicle motion, thereby being capable of increasing steering stability.

For this purpose, as illustrated in FIG. 2, an input side of the controller 21 is connected to the yaw rate sensor 11, the steering angle sensor 12, and the vehicle speed sensor 13, and an output side of the controller 21 is connected to (the actuators of) the damping force variable dampers 6 and 9, the brake hydraulic pressure control device 15, and the drive device 16. The controller 21 includes a lateral acceleration/yaw rate estimation unit 22, a differentiation unit 23, the GVC control unit 24, the M+ control unit 25, the target hydraulic pressure calculation unit 26, a target driving force calculation unit 27, a posture estimation unit 28, a pitch control unit 29, a roll suppression unit 30, a limit region determination unit 31, a relative speed estimation unit 32, an addition unit 33, and a damping force map unit 34.

To the lateral acceleration/yaw rate estimation unit 22 of the controller 21, the steering angle is input from the steering angle sensor 12 and the vehicle speed is input from the vehicle speed sensor 13. The lateral acceleration/yaw rate estimation unit 22 estimates (calculates) the lateral acceleration and the yaw rate based on a signal of the steering angle detected by the steering angle sensor 12 and a signal of the vehicle speed detected by the vehicle speed sensor 13. The lateral acceleration/yaw rate estimation unit 22 uses, for example, a vehicle model to estimate the lateral acceleration and the yaw rate from the steering angle and the vehicle speed. The lateral acceleration/yaw rate estimation unit 22 outputs the estimated lateral acceleration to the differentiation unit 23 and the pitch control unit 29, and outputs the estimated yaw rate to the limit region determination unit 31. The lateral acceleration/yaw rate estimation unit 22 includes a filter unit. The filter unit performs filter processing for reproducing dynamic characteristics on the lateral acceleration and the yaw rate. That is, the estimated lateral acceleration and yaw rate estimated through use of the vehicle model from the steering angle and the vehicle speed are signals which do not reflect the dynamic characteristics in a period from the steering of the steering wheel to actual generation of the lateral acceleration and the yaw rate on the vehicle body 1. Thus, the filter unit of the lateral acceleration/yaw rate estimation unit 22 reproduces the dynamics through use of low-pass filters (LPFs) which approximate the dynamic characteristics.

The lateral acceleration is input to the differentiation unit 23 from the lateral acceleration/yaw rate estimation unit 22. The differentiation unit 23 differentiates the lateral acceleration estimated by the lateral acceleration/yaw rate estimation unit 22, to thereby calculate the lateral jerk. That is, the differentiation unit 23 differentiates the estimated lateral acceleration calculated by the lateral acceleration/yaw rate estimation unit 22 through use of the "vehicle model" and the "LPF for considering the vehicle dynamics," to thereby calculate the lateral jerk. The lateral jerk calculated by the differentiation unit 23 is output to the relative speed estimation unit 32, the roll suppression unit 30, the GVC control unit 24, and the M+ control unit 25.

The GVC control unit 24 for executing the G-Vectoring control (GV control) controls the deceleration of the vehicle based on the lateral jerk of the vehicle. That is, the GVC control unit 24 calculates, based on the lateral jerk calculated by the differentiation unit 23, a longitudinal G command Gx_GVC (also referred to as "acceleration/deceleration command Gx_GVC") being a command for the driving forces or the braking forces to be generated on the left and right wheels 2 and 3 of the vehicle. In this case, as shown in FIG. 3, in the GV control, the same braking forces are generated on the left and right wheels 2 and 3 when the steering wheel is turned, and the lateral acceleration (Gy) consequently increases. In FIG. 3, the braking force or the driving force is indicated by adding a black arrow to each of the wheels 2 and 3. As shown in FIG. 3, when the steering wheel is turned, the braking forces corresponding to the acceleration/deceleration command Gx_GVC (negative acceleration command) are applied to the left and right front and rear wheels 2 and 3. Moreover, in the GV control, the same driving forces are generated on the left and right wheels 2 and 3 when the steering wheel is returned, and the lateral acceleration (Gy) thus decreases. That is, when the steering wheel is returned, driving forces corresponding to the acceleration/deceleration command Gx_GVC (positive acceleration command) are applied to the left and right front wheels 2.

The GVC control unit 24 includes, for example, a filter unit and a gain multiplication unit. The GVC control unit 24 performs LPF processing on the lateral jerk in the filter unit, and multiplies a gain in the gain multiplication unit, to thereby obtain a target longitudinal acceleration (acceleration/deceleration command Gx_GVC). That is, in the filter unit of the GVC control unit 24, the filtering processing through use of a low-pass filter "LPF" is performed on the lateral jerk calculated in the differentiation unit 23. In the gain multiplication unit of the GVC control unit 24, the lateral jerk on which the filter processing has been performed is multiplied by a gain (−Cxy), to thereby obtain the target longitudinal acceleration (Gx_GVC) being the longitudinal G command (acceleration/deceleration command). The target longitudinal acceleration (Gx_GVC) is given by, for example, Expression 1 below.

$$Gx\_GVC = -Cxy \cdot \dot{G}y \quad \text{[Expression 1]}$$

$\dot{G}y$: Lateral jerk

The longitudinal G command being the target longitudinal acceleration is output from the GVC control unit 24 to the posture estimation unit 28. Moreover, the longitudinal G command is output from the GVC control unit 24 to the target hydraulic pressure calculation unit 26 or the target driving force calculation unit 27. In this case, for example, when the longitudinal G command is a deceleration command having a negative value (negative target longitudinal acceleration), the deceleration command is output from the GVC control unit 24 to the target hydraulic pressure calculation unit 26. When the longitudinal G command is an acceleration command having a positive value (positive target longitudinal acceleration), the acceleration command is output from the GVC control unit 24 to the target driving force calculation unit 27.

The target hydraulic pressure calculation unit 26 calculates hydraulic pressure values (target hydraulic pressure values) being targets based on the longitudinal G command (deceleration command) output from the GVC control unit 24, and outputs the hydraulic pressure values to the brake hydraulic pressure control device 15. That is, the target hydraulic pressure calculation unit 26 calculates the target hydraulic pressures from the longitudinal G command (target longitudinal acceleration), to thereby generate the hydraulic pressures through use of the brake hydraulic pressure control device 15. The brake hydraulic pressure control device 15 generates the hydraulic pressures corresponding to the target hydraulic pressure values calculated by the target hydraulic pressure calculation unit 26. Meanwhile, the target driving force calculation unit 27 calculates driving forces (target driving forces) being targets based on the longitudinal G command (acceleration command) output from the GVC control unit 24, and outputs the values to the drive device 16. That is, the target driving force calculation unit 27 calculates the target driving forces from the longitudinal G command (target longitudinal acceleration), to thereby generate the driving forces through use of the drive device 16. The drive device 16 generates the driving forces corresponding to the target driving forces calculated by the target driving force calculation unit 27. The GVC control unit 24, the target hydraulic pressure calculation unit 26, and the target driving force calculation unit 27 calculate the target hydraulic pressures to be output to the brake hydraulic pressure control device 15 and the driving forces to be output to the drive device 16, to thereby achieve the GV control for harmoniously controlling the lateral acceleration and the longitudinal acceleration.

The M+ control unit 25 for executing the moment control (Moment+ control) controls the yaw moment of the vehicle in response to the lateral jerk of the vehicle. That is, the M+ control unit 25 calculates a moment command M+ being a command for the yaw moment to be generated on the vehicle based on the lateral jerk calculated by the differentiation unit 23. In this case, as shown in FIG. 3, in the moment control, different braking forces are generated on the left and right wheels 2 and 3 (for example, braking forces are generated on the wheels 2 and 3 on only one side), to thereby generate a yaw moment M+ (positive yaw moment) in a vehicle turn direction when the steering wheel is turned, and the lateral acceleration (Gy) consequently increases. That is, when the steering wheel is turned, the braking forces on the wheels on the inside of the turn are increased in response to the lateral jerk compared with the braking forces on the wheels on the outside of the turn (the braking forces are generated on only the wheels 2 and 3 on the left side). Moreover, in the moment control, different braking forces are generated on the left and right wheels 2 and 3 (for example, braking forces are generated on the wheels 2 and 3 on only one side), to thereby generate a yaw moment M+(negative yaw moment) in an opposite direction of the vehicle turn direction when the steering wheel is returned, and the lateral acceleration (Gy) consequently decreases. That is, when the steering wheel is returned, the braking forces on the wheels on the outside of the turn are increased in response to the lateral jerk compared with the braking forces on the wheels on the inside of the turn (the braking forces are generated on only the wheels 2 and 3 on the right side).

The M+ control unit 25 includes, for example, a filter unit and a gain multiplication unit. The M+ control unit 25 performs LPF processing on the lateral jerk in the filter unit, and multiplies a gain in the gain multiplication unit, to thereby obtain the moment command M+. That is, in the filter unit of the M+ control unit 25, the filtering processing through use of a low-pass filter "LPF" is performed on the lateral jerk calculated in the differentiation unit 23. In the gain multiplication unit of the M+ control unit 25, the lateral jerk on which the filter processing has been performed is multiplied by the gain (Cm), to thereby obtain the moment command (M+). The moment command (M+) is given by Expression 2 below.

$$M+=Cm\cdot \dot{G}y \qquad \text{[Expression 2]}$$

$\dot{G}y$: Lateral jerk

The moment command is output from the M+ control unit 25 to the posture estimation unit 28. Moreover, the moment command is output from the M+ control unit 25 to the target hydraulic pressure calculation unit 26. The target hydraulic pressure calculation unit 26 calculates hydraulic pressure values (target hydraulic pressure values) being targets based on the moment command output from the M+ control unit 25, and outputs the hydraulic pressure values to the brake hydraulic pressure control device 15. That is, the target hydraulic pressure calculation unit 26 calculates the target hydraulic pressures from the calculated moment command, to thereby generate hydraulic pressures through use of the brake hydraulic pressure control device 15. The brake hydraulic pressure control device 15 generates the hydraulic pressures corresponding to the target hydraulic pressure values calculated by the target hydraulic pressure calculation unit 26. The M+ control unit 25 and the target hydraulic pressure calculation unit 26 calculate the target hydraulic pressures to be output to the brake hydraulic pressure control device 15, to thereby achieve moment control for harmoniously controlling the lateral acceleration and the yaw moment. In this embodiment, the target hydraulic pressure calculation unit 26 calculates hydraulic pressure values being targets (target hydraulic pressure values) based on the longitudinal G command output from the GVC control unit 24 and the moment command output from the M+ control unit 25, and outputs the calculated hydraulic pressure values to the brake hydraulic pressure control device 15.

The longitudinal G command output from the GVC control unit 24 and the moment command output from the M+ control unit 25 are input to the posture estimation unit 28. The posture estimation unit 28 uses the moment command (yaw moment command value) to estimate a pitch amount and a roll amount that occur in the vehicle. In this embodiment, the posture estimation unit 28 uses both of the "longitudinal G command" and the "moment command" to estimate the pitch amount and the roll amount that occur in the vehicle. That is, the posture estimation unit 28 estimates the posture of the vehicle based on the "longitudinal G command output from the GVC control unit 24" and the "moment command output from the M+ control unit 25." In this case, the posture estimation unit 28 estimates a pitch rate and a roll rate as the posture of the vehicle (the pitch amount and the roll amount that occur in the vehicle).

Specifically, the posture estimation unit 28 estimates, from longitudinal accelerations, that is, a "longitudinal acceleration being the longitudinal G command output from the GVC control unit 24" and a "longitudinal acceleration estimated from the moment command output from the M+ control unit 25," the pitch rate that occurs in the vehicle body 1. As a result, the pitch rate corresponding to the pitch amount (pitch state) that occurs in the vehicle is estimated through use of not only the longitudinal G command, but also the yaw moment command value. In this case, the pitch rate is estimated, for example, as follows. That is, a pitch angle is calculated from the longitudinal accelerations by multiplying the longitudinal accelerations by a pitch angle/longitudinal acceleration gain, and further performing LPF processing which approximates the dynamic characteristics. The pitch angle calculated in this manner is differentiated, to thereby calculate (estimate) the pitch rate.

Moreover, the posture estimation unit 28 also estimates, from the yaw moment command value, that is, the moment command of the M+ control unit 25, the roll rate that occurs in the vehicle body 1. As a result, the yaw moment command value is used to estimate the roll rate corresponding to the roll amount (roll state) that occurs in the vehicle. In this case, the roll rate is calculated by, for example, calculating a roll angle from the roll moment estimated from the moment command, and differentiating the roll angle. Moreover, LPF processing is performed as required. The pitch rate (estimated pitch rate) calculated by the posture estimation unit 28 is output to the pitch control unit 29. The roll rate (estimated roll rate) calculated by the posture estimation unit 28 is output to the roll suppression unit 30.

The lateral acceleration (estimated lateral acceleration) output from the lateral acceleration/yaw rate estimation unit 22, the pitch rate (estimated pitch rate) output from the posture estimation unit 28, and a pitch control weight coefficient output from the limit region determination unit 31 are input to the pitch control unit 29. The pitch control unit 29 forms target pitch amount calculation means (target pitch state calculation means) for calculating (acquiring), from the turn state of the vehicle body, a target pitch amount (specifically, pitch rate) being a target. The pitch control unit 29 receives input of the pitch rate (estimated pitch rate) calculated by the posture estimation unit 28, to thereby adjust the forces of the damping force variable dampers 6 and 9 so that the pitch amount (target pitch rate) calculated by the pitch control unit 29 approaches the target value also in a vehicle which executes the moment control and the GV control. Thus, the pitch control unit 29 calculates the target pitch rate by estimating the pitch angle from the lateral acceleration, multiplying the absolute value of the estimated pitch angle by a gain, and differentiating the product. After that, the pitch control unit 29 calculates a difference between the target pitch rate calculated from the lateral acceleration and the pitch rate (predicted pitch rate) estimated by the posture estimation unit 28, and calculates, from the calculated difference pitch rate in consideration of dynamics in the pitch direction, a target damping force for each wheel so that the target pitch rate is reached through FF control. As a result, the controller 21 can estimate the pitch amount that occurs in the vehicle, and can output, to the damping force variable dampers 6 and 9, such command values that the estimated pitch amount approaches the target pitch amount. Further, the pitch control unit 29 weights each of the calculated target damping forces through multiplication by the pitch control weight coefficient output from the limit region determination unit 31, and outputs the target damping forces multiplied by the weight coefficient to the addition unit 33.

In this case, when the predicted pitch rate generated by the longitudinal acceleration (longitudinal G command) of the GVC control unit 24 is larger than the target pitch rate, the object of the pitch control unit 29 is to reduce the pitch. Thus, when a difference between the target pitch rate and an absolute value of the predicted pitch rate is calculated, and the value is positive, the target pitch rate is larger, and hence a control term for generating the pitch in consideration of the pitch dynamics is used to generate the pitch. Conversely, when the difference between the target pitch rate and the absolute value of the predicted pitch rate is calculated, and the value is negative, the predicted pitch rate is larger, and hence a control term for suppressing the pitch is used to suppress the pitch.

The lateral jerk output from the differentiation unit 23, the roll rate (estimated roll rate) output from the posture estimation unit 28, and a roll suppression weight coefficient output from the limit region determination unit 31 are input to the roll suppression unit 30. The roll suppression unit 30 forms target roll amount calculation means (target roll state calculation means) for calculating (acquiring), from the turn state of the vehicle body, a target roll amount (specifically, roll rate) being a target. The roll suppression unit 30 receives input of the roll rate (estimated roll rate) calculated by the posture estimation unit 28, to thereby adjust the forces of the damping force variable dampers 6 and 9 so that the roll amount (target roll rate) calculated by the roll suppression unit 30 approaches the target value also in the vehicle which executes the moment control and the GV control. Thus, the roll suppression unit 30 calculates the roll rate based on the lateral jerk calculated by the differentiation unit 23, and multiplies the calculated roll rate by a gain, to thereby calculate target damping forces so that the roll is suppressed.

That is, the roll suppression unit 30 calculates the target damping force being the force (damping force) to be generated in each of the damping force variable dampers 6 and 9 on each wheel side in order to execute roll suppression control. In this case, the roll suppression unit 30 calculates each target damping force based on the lateral jerk so that the roll is suppressed. In this case, the roll suppression unit 30 calculates, for example, a difference between the target roll rate calculated from the lateral jerk and the roll rate (predicted roll rate) estimated by the posture estimation unit 28, and calculates, from the calculated difference roll rate, the target damping force for each wheel so that the target roll rate is reached. As a result, the controller 21 can estimate the roll amount that occurs in the vehicle based on the lateral jerk and the yaw moment command value, and can output, to the damping force variable dampers 6 and 9, such command values that the estimated roll amount approaches the target roll amount. Further, the roll suppression unit 30 weights each of the calculated target damping forces through multiplication by the roll suppression weight coefficient output from the limit region determination unit 31, and outputs the target damping forces multiplied by the weight coefficient to the addition unit 33.

In this case, regarding the roll, influence of the moment control on the vehicle is different between the turning and the returning of the steering. Thus, in response to the moment command being the command value for the moment control, roll control commands (target damping forces) are increased for the turning, and the roll control commands (target damping forces) are reduced for the returning, to thereby secure a consistent roll behavior in response to the steering. That is, the roll suppression unit 30 uses the roll rate (predicted roll rate) estimated by the posture estimation unit 28 from the moment command of the M+ control unit 25 to execute the roll suppression control corresponding to the moment command. In this case, the roll suppression unit 30 increases the roll control commands (target damping forces) for the turning of the steering, and reduces the roll control commands (target damping forces) for the returning of the steering.

The yaw rate (actual yaw rate) detected by the yaw rate sensor 11 and the estimated yaw rate calculated by the lateral acceleration/yaw rate estimation unit 22 are input to the limit region determination unit 31. The limit region determination unit 31 determines whether or not ground contact forces (grip forces) of tires during the travel of the vehicle reach a limit region (nonlinear region) from a normal region (linear region), and outputs weight coefficients corresponding to the determination result, that is, the weight coefficients for adjusting the control amounts (target damping forces) of the posture of the vehicle. In this case, the limit region determination unit 31 adjusts the control amounts for the roll suppression and the pitch control in response to a difference yaw rate. That is, the limit region determination unit 31 calculates the difference yaw rate being a difference between the yaw rate (estimated yaw rate) estimated by the lateral acceleration/yaw rate estimation unit 22, and output from the lateral acceleration/yaw rate estimation unit 22 and the actual yaw rate detected by the yaw rate sensor 11.

The limit region determination unit 31 calculates, based on the difference yaw rate, the roll suppression weight coefficient for adjusting the control amounts for the roll suppression and the pitch control weight coefficient for adjusting the control amounts for the pitch control. The limit region determination unit 31 outputs the roll suppression weight coefficient to the roll suppression unit, and outputs the pitch control weight coefficient to the pitch control unit. Accordingly, the controller 21 adjusts the forces of the damping force variable dampers 6 and 9 based on the difference yaw rate being the difference between the estimated value of the yaw rate of the vehicle and the detection value thereof. That is, the controller 21 outputs the command values to the damping force variable dampers 6 and 9 serving as the force generation devices based on the difference yaw rate being the difference between the estimated value of the yaw rate of the vehicle and the detection value thereof. In this case, for example, the limit region determination unit 31 determines that the tires during the travel of the vehicle are in a state close to the limit region when the difference yaw rate becomes larger, and in this case, increases the roll suppression weight coefficient so that the control on the roll suppression unit 30 side is weighted, and reduces the pitch control weight coefficient to a value equal to or close to "0" so that the control on the pitch control unit 29 side is relatively small.

The lateral jerk is input to the relative speed estimation unit 32 from the differentiation unit 23. The relative speed estimation unit 32 estimates (calculates), as a relative speed, an extension/contraction speed (stroke speed) in the vertical direction of the damping force variable damper 6 or 9 of each wheel based on the lateral jerk calculated by the differentiation unit 23. That is, the relative speed estimation unit 32 uses a geometrical relationship to estimate the relative speed of each wheel from the roll rate calculated from the lateral jerk and vehicle specifications. The relative speeds estimated by the relative speed estimation unit 32 are input to the damping force map unit 34.

The target damping forces output from the roll suppression unit 30 and the target damping forces output from the pitch control unit 29 are input to the addition unit 33. The addition unit 33 adds each of the damping forces corresponding to the roll suppression control amounts calculated by the roll suppression unit 30 and each of the damping forces corresponding to the pitch control amounts calculated by the pitch control unit 29 to each other, and outputs, as a target damping force for each wheel, each of the sums to the damping force map unit 34.

The relative speeds output from the relative speed estimation unit 32 and the target damping forces output from the addition unit 33 are input to the damping force map unit 34. The damping force map unit 34 calculates each command current value from each of the target damping forces and each of the estimated relative speeds based on a map of a damping force characteristic (a relationship among the damping force, the command current value, and the relative speed) stored in advance. The damping force map unit 34 outputs each of the calculated command current values to each current driver (not shown), to thereby supply a current corresponding to the command current value to each of the damping force variable dampers 6 and 9 through the current driver. Accordingly, the damping force of each of the damping force variable dampers 6 and 9 is variably adjusted.

As described above, in the first embodiment, the posture estimation unit 28 of the controller 21 estimates (calculates) the pitch amount and the roll amount (predicted pitch rate and predicted roll rate) that occur in the vehicle through use of the "yaw moment command value (moment command) for generating the yaw moment on the vehicle based on the change rate (lateral jerk) of the lateral acceleration of the vehicle" and/or the "acceleration/deceleration command value (longitudinal G command) for generating the acceleration/deceleration on the vehicle based on the change rate (lateral jerk) of the vehicle." After that, the pitch control unit 29 and the roll suppression unit 30 of the controller 21 adjust the damping force of each of the damping force variable dampers 6 and 9 through use of the pitch amount and the roll amount (predicted pitch rate and predicted roll rate) estimated by the posture estimation unit 28 so that the pitch amount calculated by the pitch control unit 29 and the roll amount calculated by the roll suppression unit 30 approach the respective target values. In this case, based on the yaw moment command, the controller 21 increases the roll control commands (target damping forces) for the turning of the steering, and reduces the roll control commands (target damping forces) for the returning of the steering. The damping force of each of the damping force variable dampers 6 and 9 may be adjusted so that only the roll amount, which is large in influence of the moment control on the vehicle, approaches the target value. In other words, it may be only required that the roll amount that occurs in the vehicle be estimated, and the roll amount calculated by the roll suppression unit 30 serving as the target roll amount calculation means approach the target value. That is, the command values of the pitch control unit 29 are not required to be input to the damping force map unit 34.

As described above, in the first embodiment, the controller 21 calculates the target roll amount being the target from the turn state of the vehicle body. Moreover, the controller 21 estimates the roll amount that occurs in the vehicle based on the change rate of the lateral acceleration of the vehicle and the yaw moment command value for generating the yaw moment, and outputs, to the damping force variable dampers 6 and 9 serving as the force generation devices, such command values that the estimated roll amount approaches the target roll amount. Further, the controller 21 calculates, from the turn state of the vehicle body, the target pitch amount being the target. After that, the controller 21 estimates the pitch amount that occurs in the vehicle, and outputs, to the damping force variable dampers 6 and 9 serving as the force generation devices, such command values that the estimated pitch amount approaches the target pitch amount. In this case, the controller 21 estimates, based on the change rate of the lateral acceleration of the vehicle, the pitch amount and the roll amount that occur in the vehicle through use of the acceleration/deceleration command value for generating an acceleration/deceleration and the yaw moment command value, and outputs, to each of the damping force variable dampers 6 and 9 serving as the force generation devices, such a command value that the estimated pitch amount and roll amount approach the target pitch amount and the target roll amount, respectively.

The vehicle motion control apparatus according to the first embodiment has the above-mentioned configuration. Description is now given of posture control processing for the vehicle body 1 by the controller 21.

First, the differentiation unit 23 differentiates the estimated lateral acceleration calculated by the lateral acceleration/yaw rate estimation unit 22 through the vehicle model and the low-pass filter (LPF), which is used to consider the vehicle dynamics, to thereby calculate the lateral jerk. The GVC control unit 24 performs the LPF processing on the lateral jerk, and multiplies the processed lateral jerk by the gain, to thereby calculate the target longitudinal acceleration being the longitudinal G command. The target hydraulic pressure calculation unit 26 calculates the target hydraulic pressures from the longitudinal G command (target longitudinal acceleration) calculated by the GVC control unit 24, and generates the hydraulic pressures in the wheel cylinder (disc brake) on each wheel side through use of the brake hydraulic pressure control device 15. Moreover, the target driving force calculation unit 27 calculates the target driving forces from the longitudinal G command (target longitudinal acceleration) calculated by the GVC control unit 24, and applies the driving forces to each wheel (left and right front wheels 2 and 2) through use of the drive device 16. Through this control, the GV control for harmoniously controlling the lateral acceleration and the longitudinal acceleration is achieved. Meanwhile, the M+ control unit 25 performs the LPF processing on the lateral jerk, and multiplies the processed lateral jerk by the gain, to thereby calculate the moment command (yaw moment command). The target hydraulic pressure calculation unit 26 calculates the target hydraulic pressures from the moment command calculated by the M+ control unit 25, and generates the hydraulic pressures in the wheel cylinder (disc brake) on each wheel side through use of the brake hydraulic pressure control device 15. Through this control, the moment control (M+ control or yaw moment control) for harmoniously controlling the lateral acceleration and the yaw moment is achieved.

Description is now given of the roll suppression control and the pitch control. The roll suppression unit 30 calculates each of the target damping forces based on the lateral jerk so that the roll is suppressed. The pitch control unit 29 calculates each of the target damping forces based on the lateral acceleration so that roll feeling is increased. In this case, the pitch control unit 29 multiplies the absolute value of the roll angle estimated from the lateral acceleration by the gain, to thereby calculate the target pitch rate. In this case, in order to execute the pitch control corresponding to the GV control and the moment control, the posture estimation unit 28 estimates the pitch rate that occurs due to the "longitudinal G command of the GV control" and the "longitudinal acceleration generated from the moment command of the moment control." Moreover, the posture estimation unit 28 also estimates the roll rate that occurs due to the moment command of the moment control.

The pitch control unit 29 calculates the difference between the pitch rate (predicted pitch rate) estimated by the posture estimation unit 28 and the target pitch rate, and calculates the target damping forces for each wheel from the calculated difference pitch rate in consideration of the dynamics in the pitch direction so that the target pitch rate is reached through the FF control. In this case, when the pitch rate that occurs due to the longitudinal accelerations of the GV control and the moment control is larger than the target pitch rate, the object is to reduce the pitch. Thus, when the difference between the target pitch rate and the absolute value of the predicted pitch rate is calculated, and the value is positive, the target pitch rate is larger, and hence the control term for generating the pitch in consideration of the pitch dynamics is used to generate the pitch. Conversely, when the difference between the target pitch rate and the absolute value of the predicted pitch rate is calculated, and the value is negative, the predicted pitch rate is larger, and hence the control term for suppressing the pitch is used to suppress the pitch.

Meanwhile, the roll suppression unit 30 calculates the difference between the target roll rate calculated from the lateral jerk and the roll rate (predicted roll rate) estimated by the posture estimation unit 28, and calculates the target damping forces for each wheel from the calculated difference roll rate so that the target roll rate is reached. In this case, regarding the roll, the influence of the moment control on the vehicle is different between the turning and the returning of the steering. Thus, in response to the moment control command value (moment command), the roll control commands (target damping forces) are increased for the turning, and the roll control commands (target damping forces) are reduced for the returning. With this configuration, the consistent roll behavior can be secured during the steering.

Moreover, the limit region determination unit 31 calculates the difference yaw rate being the difference between the yaw rate (estimated yaw rate) calculated by the lateral acceleration/yaw rate estimation unit 22 and the actual yaw rate detected by the yaw rate sensor 11. The limit region determination unit 31 adjusts the control amounts for the roll suppression and the pitch control in response to the difference yaw rate. Specifically, the limit region determination unit 31 calculates, based on the difference yaw rate, the roll suppression weight coefficient for adjusting the control amounts for the roll suppression and the pitch control weight coefficient for adjusting the control amounts for the pitch control. The limit region determination unit 31 outputs the roll suppression weight coefficient to the roll suppression unit 30, and outputs the pitch control weight coefficient to the pitch control unit 29. The roll suppression unit 30 multiplies each of the target damping forces by the roll suppression weight coefficient. The pitch control unit 29 multiplies each of the target damping forces by the pitch suppression weight coefficient. As a result, the target damping forces can be adjusted in response to the ground contact forces (grip forces) of the tires during the travel of the vehicle.

Further, the relative speed estimation unit 32 calculates the roll rate from the lateral jerk calculated by the differentiation unit 23, and uses the geometrical relationship to estimate the relative speed of each wheel from the calculated roll rate and the vehicle specifications. Meanwhile, the addition unit 33 adds each of the target damping forces (roll suppression control amounts) calculated by the roll suppression unit 30 as described above and each of the target damping forces (pitch control amounts) calculated by the pitch control unit 29 as described above to each other, and outputs each of the sums as the target damping force for each wheel. The damping force map unit 34 calculates the command current values through use of the damping force characteristic (damping force-command current value-relative speed) stored in advance in the controller 21 from each of the target damping forces and each of the relative speeds estimated by the relative speed estimation unit 32 for each wheel. The controller 21 generates the calculated current values by each of the current drivers, to thereby change the damping force of each of the damping force variable dampers 6 and 9.

FIG. 3 shows the example of the temporal changes in the lateral acceleration (Gy), the acceleration/deceleration command (Gx_GVC), the moment command (M+), the roll angles, the pitch angles, and the suspension control commands (damping force commands directed to each of the damping force variable dampers 6 and 9). In FIG. 3, a solid line 41 indicates the change in the lateral acceleration Gy, a solid line 42 indicates the change in the acceleration/deceleration command (longitudinal G command) Gx_GVC, and a solid line 43 indicates the change in the moment command M+. Moreover, in FIG. 3, broken lines 44, 45, and 46 indicate a change in the roll angle, a change in the pitch angle, and a change in the suspension control command (damping force), respectively, at the time when the damping forces of the damping force variable dampers 6 and 9 are adjusted in consideration of the posture change due to the GV control in a vehicle in which the GV control is executed as in a technology as described in Patent Literature 2. In FIG. 3, two-dot chain lines 47, 48, and 49 indicate a change in the roll angle, a change in the pitch angle, and a change in the suspension control command (damping force), respectively, at the time when the damping forces of the damping force variable dampers 6 and 9 are adjusted in consideration of the posture change due to the GV control in a vehicle in which the GV control and the moment control are executed. In FIG. 3, solid lines 50, 51, and 52 indicate a change in the roll angle, a change in the pitch angle, and a change in the suspension control command (damping force), respectively, at the time when the damping forces of the damping force variable dampers 6 and 9 are adjusted in consideration of the posture change due to the GV control and the moment control in a vehicle in which the GV control and the moment control are executed, that is, in this embodiment.

When the posture change due to the moment control is not considered, as apparent from the two-dot chain line 48 that indicates the change in the roll angle, the roll is promoted or suppressed due to the roll moment caused by application of the brakes to the wheels on one side through the moment control. That is, when the steering is turned, the roll is promoted, and when the steering is returned, the roll is suppressed. Meanwhile, as apparent from a comparison between the solid line 52 and the two-dot chain line 49 of the suspension control commands (damping forces) of FIG. 3, in this embodiment in which the posture change due to the moment control is considered, the suspension control command (damping force) is increased when the steering is turned, and the suspension control command (damping force) is reduced when the steering is returned. Accordingly, as apparent from a comparison between the solid line 51 and the two-dot chain line 48 of the pitch angles of FIG. 3, in this embodiment, the change in the pitch angle can be suppressed when the steering is turned and when the steering is returned.

Moreover, as apparent from a comparison between the solid line 50 and the two-dot chain line 47 of the roll angles of FIG. 3, in this embodiment, the promotion of the roll can be reduced when the steering is turned, and the suppression of the roll can be reduced when the steering is returned. That is, in this embodiment, the steering stability of the vehicle can be increased by controlling the damping force variable dampers 6 and 9 in consideration of the pitch that occurs due to the GV control and the moment control and the roll that occurs due to the moment control. In this case, it is possible to suppress the pitch and roll, in particular, the roll, which occurs when the steering is returned (at the time of lane change and turn exit). That is, pitch can be generated through an accelerator operation during the turn exit to adjust the pitch, but the roll cannot be generated to adjust the roll. Meanwhile, in this embodiment, the roll can be adjusted by adjusting the damping forces of the damping force variable dampers 6 and 9 in consideration of the posture change due to the moment control.

As described above, according to the first embodiment, the controller 21 estimates the pitch amount and the roll amount (pitch rate and roll rate) that occur in the vehicle from the yaw moment command value (moment command) and the acceleration/deceleration command value (longitudinal G command), and adjusts the forces (damping forces) of the damping force variable dampers 6 and 9 so that the pitch amount calculated by the pitch control unit 29 and the roll amount calculated by the roll suppression unit 30 approach the respective target values. Thus, the force (damping force) of each of the damping force variable dampers 6 and 9 is adjusted to the force calculated in consideration of the "changes in the pitch amount and the roll amount due to the yaw moment generated based on the moment command" and the "changes in the pitch amount and the roll amount due to the pitch moment generated based on the moment command and the longitudinal G command."

As a result, it is possible to reduce the promotion or the suppression of the roll due to the yaw moment generated based on the moment command. Moreover, it is possible to reduce the promotion or the suppression of the pitch due to the pitch moment generated based on the moment command and the longitudinal G command. That is, it is possible to cancel the promotion or the suppression of the roll change due to the yaw moment generated based on the moment command, and roll/pitch combination can be maintained. Moreover, it is possible to cancel the promotion or the suppression of the pitch due to the pitch moment generated based on the moment command and the longitudinal G command, and the roll/pitch combination can be maintained also in this respect. As a result, it is possible to suppress the unnecessary posture change of the vehicle, and responsiveness and convergence of the yaw motion can be improved. Consequently, it is possible to provide the consistent vehicle motion, to thereby increase the steering stability in the vehicle in which the braking/driving forces are generated by the brake hydraulic pressure control device 15 and the drive device 16 based on the moment command and the longitudinal G command when the vehicle is steered.

According to the first embodiment, the forces (damping forces) of the damping force variable dampers 6 and 9 are adjusted based on the difference yaw rate being the difference between the estimated value of the yaw rate of the vehicle and the detection value thereof. Thus, it is possible to estimate whether the ground contact forces (grip forces) of the tires during the travel of the vehicle are within the normal region or the limit region from the difference yaw rate, and to adjust the forces (damping forces) of the damping force variable dampers 6 and 9 based on the estimated region. That is, the damping forces of the damping force variable dampers 6 and 9 can be adjusted in consideration of the state of the ground contact forces of the tires, and the steering stability can be increased also in this respect.

According to the first embodiment, based on the moment command, the controller 21 increases the roll control commands (suspension control commands of FIG. 3) for the turning of the steering, and reduces the roll control commands (suspension control commands of FIG. 3) for the returning of the steering. Thus, the promotion of the roll at the time when the steering is turned can be reduced, and the suppression of the roll at the time when the steering is returned can be reduced.

Figure 4:
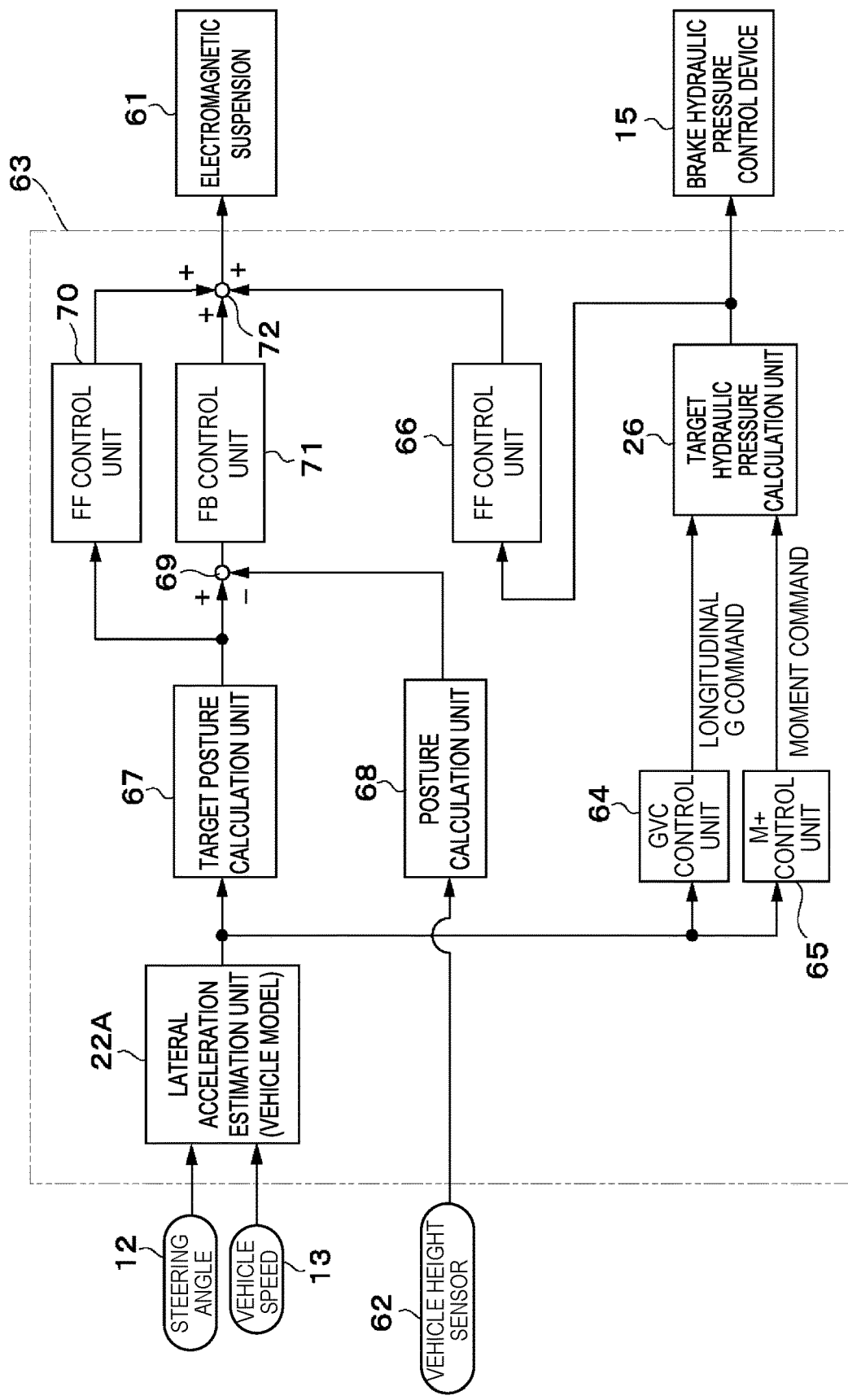
FIG. 4 is a control block diagram for illustrating a vehicle motion control apparatus according to a second embodiment of the present invention.

Next, in FIG. 4, a second embodiment of the present invention is shown. A feature of the second embodiment is that the actuators (force generation mechanisms) which execute the posture control of the vehicle body are not the semi-active suspensions (for example, the hydraulic shock absorbers of the damping force adjustable type), but active suspensions (for example, electromagnetic suspensions) which can generate thrust forces by the suspensions themselves. More specifically, the second embodiment has a configuration of controlling the electromagnetic suspensions (electric actuators) through FF control (feedforward control) and FB control (feedback control) to cancel the forces generated on the vehicle body from the control commands of the GV control and the moment control through the FF control, to thereby achieve a target posture. In the second embodiment, the same components as those in the first embodiment are denoted by the same reference symbols, and description thereof is omitted.

In the second embodiment, a plurality of electromagnetic suspensions 61 are interposed between the vehicle body 1 and the plurality of wheels 2 and 3 of the vehicle. The electromagnetic suspension 61 is formed of an electric actuator (electromagnetic damper) such as an electric linear actuator. The electromagnetic suspension 61 forms the force generation device capable of adjusting the force generated between the vehicle body 1 and each wheel 2. The electromagnetic suspension 61 forms, together with the controller 63 described below, the suspension control device to be used for the vehicle.

Moreover, the second embodiment includes a vehicle height sensor 62. The vehicle height sensor 62 is installed on the vehicle body 1. The vehicle height sensor 62 detects, for example, a vehicle height on each of the sides of the left and right front wheels 2 and the left and right rear wheels 3, and outputs detection signals thereof to the controller 63. An input side of the controller 63 is connected to the vehicle height sensor 62, the steering angle sensor 12, and the vehicle speed sensor 13, and an output side of the controller 63 is connected to the actuators (electric linear actuators) of the electromagnetic suspensions 61 and the brake hydraulic pressure control device 15. The controller 63 includes a lateral acceleration estimation unit 22A, a GVC control unit 64, an M+ control unit 65, the target hydraulic pressure calculation unit 26, an FF control unit 66, a target posture calculation unit 67, a posture calculation unit 68, a difference calculation unit 69, an FF control unit 70, an FB control unit 71, and an addition unit 72. In the first embodiment, the controller 63 includes the lateral acceleration/yaw rate estimation unit 22 which estimates the lateral acceleration and the yaw rate, while in the second embodiment, the controller 63 includes the lateral acceleration estimation unit 22A which estimates the lateral acceleration.

The lateral acceleration estimation unit 22A of the controller 63 outputs the estimated lateral acceleration to the target posture calculation unit 67, the GVC control unit 64, and the M+ control unit 65. The GVC control unit 64 differentiates the lateral acceleration estimated by the lateral acceleration estimation unit 22A, to thereby calculate lateral jerk, and calculates, based on the calculated lateral jerk, the longitudinal G command being the command of the driving forces or the braking forces to be generated by the left and right wheels 2 and 3 of the vehicle. That is, the GVC control unit 64 in the second embodiment is formed of the differentiation unit 23 and the GVC control unit 24 in the first embodiment (for any thereof, see FIG. 2). The M+ control unit 65 differentiates the lateral acceleration estimated by the lateral acceleration estimation unit 22A, to thereby calculate the lateral jerk, and calculates the moment command being the command of the yaw moment to be generated on the vehicle based on the calculated lateral jerk. That is, the M+ control unit 65 in the second embodiment is formed of the differentiation unit 23 and the M+ control unit 25 in the first embodiment (for any thereof, see FIG. 2).

The longitudinal G command calculated by the GVC control unit 64 and the moment command calculated by the M+ control unit 65 are output to the target hydraulic pressure calculation unit 26. The target hydraulic pressure calculation unit 26 calculates, as in the target hydraulic pressure calculation unit 26 in the first embodiment, each of the brake command values for each wheel, which is the hydraulic pressure value being the target (target hydraulic pressure value), based on the longitudinal G command output from the GVC control unit 64 and the moment command output from the M+ control unit 65, and outputs the brake command values to the brake hydraulic pressure control device 15 and the FF control unit 66.

The brake command values for each wheel output from the target hydraulic pressure calculation unit 26 is input to the FF control unit 66. The FF control unit 66 calculates (estimates) the roll moment and the pitch moment (predicted roll moment and predicted pitch moment) generated due to the brake command values for each wheel based on the moment command and/or the longitudinal G command. After that, the FF control unit 66 outputs command values (command roll moment and command pitch moment) that cancel the roll moment and the pitch moment to the addition unit 72. In this manner, the FF control unit 66 estimates (calculates) the pitch amount and the roll amount (predicted pitch moment and predicted roll moment) that occur in the vehicle through use of the brake command values for each wheel output from the target hydraulic pressure calculation unit 26.

The target posture calculation unit 67, the posture calculation unit 68, the difference calculation unit 69, the FF control unit 70, the FB control unit 71, and the addition unit 72 correspond to the target pitch amount calculation means and the target roll amount calculation means. The lateral acceleration (estimated lateral acceleration) of the vehicle body 1 estimated by the lateral acceleration estimation unit 22A is input to the target posture calculation unit 67. The target posture calculation unit 67 calculates a target roll rate and a target pitch rate from the estimated lateral acceleration. The target posture calculation unit 67 outputs the target roll rate and the target pitch rate to the difference calculation unit 69 and the FF control unit 70. The vehicle heights detected by the vehicle height sensor 62 are input to the posture calculation unit 68. The posture calculation unit 68 calculates an actual roll rate and an actual pitch rate from the vehicle heights (actual vehicle heights) detected by the vehicle height sensor 62. The posture calculation unit 68 outputs the actual roll rate and the actual pitch rate to the difference calculation unit 69.

The difference calculation unit 69 calculates differences between the target roll rate and the target pitch rate calculated by the target posture calculation unit 67 and the actual roll rate and the actual pitch rate calculated by the posture calculation unit 68, respectively, and outputs the differences (differences from the target values) to the FB control unit 71.

When the target roll rate and the target pitch rate are input to the FF control unit 70 from the target posture calculation unit 67, the FF control unit 70 calculates a target roll moment and a target pitch moment through feedforward control, and outputs the target roll moment and the target pitch moment to the addition unit 72. The FB control unit 71 calculates a target roll moment and a target pitch moment through feedback control in accordance with the differences from the target values calculated by the difference calculation unit 69, and outputs the target roll moment and the target pitch moment to the addition unit 72.

The addition unit 72 adds the target roll moment and the target pitch moment output from the FF control unit 70, the target roll moment and the target pitch moment output from the FB control unit 71, and the command values (command roll moment and command pitch moment) output from the FF control unit 66 for canceling the roll moment and the pitch moment generated due to the GV control and the moment control to one another, respectively. As a result, the addition unit 72 calculates a final target roll moment and a final target pitch moment, and outputs the target roll moment and the target pitch moment to (the actuators of) the electromagnetic suspensions 61. In this case, the addition unit 72 calculates a control amount so that each of target thrust forces FR, FL, RR, and RL corresponding to the target pitch moment and the target roll moment that are distributed to each wheel side can be generated by the electromagnetic suspension 61 on each wheel side, and individually outputs control signals corresponding to the calculated control amounts (target thrust forces FR, FL, RR, and RL) to the electromagnetic suspensions 61.

As described above, in the second embodiment, the addition unit 72 of the controller 63 uses the command values (command roll moment and command pitch moment) obtained from the pitch amount and the roll amount (predicted pitch moment and predicted roll moment) estimated by the FF control unit 66 to adjust the control forces of the electromagnetic suspensions 61 so that the pitch amount (pitch moment) and the roll amount (roll moment) obtained by the target posture calculation unit 67, the posture calculation unit 68, the difference calculation unit 69, the FF control unit 70, and the FB control unit 71 approach the respective target values. That is, the controller 63 estimates, based on the change rate of the lateral acceleration of the vehicle, the pitch amount and the roll amount that occur in the vehicle through use of the acceleration/deceleration command value for generating the acceleration/deceleration and the yaw moment command value, and outputs, to the damping force variable dampers 6 and 9 serving as the force generation devices, such command values that the estimated pitch amount and the estimated roll amount approach the target pitch amount and the target roll amount, respectively.

In the second embodiment, the above-mentioned controller 63 is used to adjust the forces (control forces) of the electromagnetic suspensions 61, and the second embodiment is not particularly different from the above-mentioned first embodiment in the basic operation. According to the second embodiment, the controller 63 calculates, in the FF control unit 66, the roll moment and the pitch moment generated due to the brake command values for each wheel through the GV control and the moment control, and outputs, to the addition unit 72, the command values that cancel the roll moment and the pitch moment. As a result, the roll behavior and the pitch behavior that occur due to the GV control and the moment control are suppressed, thereby being capable of precisely achieving the target posture.

In the first embodiment, description is given by exemplifying the case in which the one controller 21 executes the control for the brake hydraulic pressure control device 15 and the drive device 16 and the control for the damping force variable dampers 6 and 9. That is, in the first embodiment, the controller 21 forms a part of the braking/driving force control means (braking/driving force controller) for generating the braking/driving forces when the vehicle is steered, and forms the force adjustment means (control unit) for adjusting the forces of the force generation devices (damping force variable dampers 6 and 9). However, the configuration is not limited to this example, and there may be provided, for example, such a configuration that a controller (braking/driving force controller) which controls the brake hydraulic pressure control device 15 and the drive device 16, and a controller (control unit) which controls the damping force variable dampers 6 and 9 are independently provided, and those controllers are connected to each other through a communication line (signal line). This also applies to the second embodiment.

In the first embodiment, description is given by exemplifying the case of the vehicle capable of executing both of the GV control and the moment control (vehicle yaw moment control or M+ control) as the control of generating the braking/driving forces in the vehicle. However, the configuration is not limited to this example, and, for example, the vehicle may be a vehicle which does not execute the GV control but executes the moment control. Moreover, in the first embodiment, description is given by exemplifying the case of the vehicle capable of generating both the braking forces and the driving forces as the GV control. However, the configuration is not limited to this example, and the vehicle may be, for example, a vehicle which executes GV control of not generating the driving forces, but generating the braking forces, or a vehicle which executes GV control of not generating the braking forces, but generating the driving forces. Further, in the first embodiment, description is given by exemplifying the case of the vehicle which generates the braking forces as the moment control. However, the configuration is not limited to this example, and the vehicle may be, for example, a vehicle which executes the moment control of not generating the braking forces, but generating the driving forces, or a vehicle capable of generating, as the moment control, both of the braking forces and the driving forces. These also apply to the second embodiment.

In each embodiment, description is given by exemplifying the case in which the lateral acceleration is estimated from the steering angle and the vehicle speed through use of the vehicle model. However, the configuration is not limited to this example, and, for example, a sensor may be used to detect the lateral acceleration, and the calculation method for the lateral acceleration is not limited to any method. That is, the change rate of the lateral acceleration may be obtained from a change rate of the steering angle, a derivative of the yaw rate, a derivative of a curvature, navigation data, or the like. Moreover, regarding the estimation of the relative speeds, description is given by exemplifying the case in which the relative speeds are estimated from the lateral acceleration (estimated lateral acceleration), but each of the relative speeds may be obtained by, for example, a method of differentiating the vehicle height sensor value, or integrating a difference between a sprung acceleration sensor value and an unsprung acceleration sensor value. Further, each embodiment is an example, and it is to be understood that the configurations as described in the different embodiments can be partially replaced or combined.

As the vehicle motion control apparatus based on the above-mentioned embodiments, for example, the following aspects are conceivable.

As a first aspect, there is provided a vehicle motion control apparatus to be used for a vehicle, the vehicle including: a braking/driving force controller configured to adjust braking/driving forces when the vehicle is steered; and a plurality of force generation devices each of which is interposed between a vehicle body of the vehicle and one of a plurality of wheels, and is configured to adjust a force generated between the vehicle body and the one of the plurality of wheels, the vehicle motion control apparatus including a control unit configured to adjust the force of each of the plurality of force generation devices, wherein the control unit is configured to: calculate, from a turn state of the vehicle body, a target roll amount being a target; and estimate, based on a change rate of a lateral acceleration of the vehicle and a yaw moment command value for generating a yaw moment, a roll amount that occurs in the vehicle, and output, to each of the plurality of force generation devices, such a command value that the estimated roll amount approaches the target roll amount.

According to the first aspect, the control unit outputs the command values to the force generation devices in consideration of the yaw moment command value, and hence it is possible to reduce the promotion or the suppression of the change in the roll posture in the vehicle which controls (generates) the yaw moment.

As a second aspect, in the first aspect, the control unit is configured to: calculate, from the turn state of the vehicle body, a target pitch amount being a target; and estimate a pitch amount that occurs in the vehicle, and output, to each of the plurality of force generation devices, such a command value that the estimated pitch amount approaches the target pitch amount. According to the second aspect, the forces of the force generation devices can be adjusted also through use of the pitch amount.

As another aspect, in the second aspect, the control unit is configured to estimate, based on the change rate of the lateral acceleration of the vehicle, the pitch amount and the roll amount that occur in the vehicle through use of the yaw moment command value for generating the yaw moment, and adjust the force of each of the plurality of force generation devices so that the estimated pitch amount and the estimated roll amount approach the target pitch amount and the target roll amount, respectively.

According to this another aspect, the control unit estimates, from the yaw moment command value, the pitch amount and the roll amount that occur in the vehicle, and adjusts the forces of the force generation devices so that the estimated pitch amount and the estimated roll amount approach the target pitch amount and the target roll amount, respectively. Thus, the forces of the force generation devices are adjusted to forces obtained in consideration of the changes of the pitch amount and the roll amount due to the yaw moment generated based on the yaw moment command value. As a result, it is possible to reduce the promotion or the suppression of the roll due to the yaw moment generated based on the yaw moment command value. That is, it is possible to cancel the promotion or the suppression of the roll due to the yaw moment generated based on the yaw moment command value, and hence the roll/pitch combination can be maintained. Moreover, an unnecessary posture change can be suppressed, and the responsiveness and the convergence of the yaw motion can also be improved. As a result, in the vehicle which generates the braking/driving forces through use of the braking/driving force controller based on the yaw moment command value when the vehicle is steered, the consistent vehicle motion can be provided, and the steering stability can be increased.

As a third aspect, in the second aspect, the control unit is configured to estimate, based on the change rate of the lateral acceleration of the vehicle, the pitch amount and the roll amount that occur in the vehicle through use of an acceleration/deceleration command value for generating an acceleration/deceleration and the yaw moment command value, and output, to each of the plurality of force generation devices, such command values that the estimated pitch amount and the estimated roll amount approach the target pitch amount and the target roll amount, respectively.

According to the third aspect, the control unit can estimate, from the yaw moment command value and the acceleration/deceleration command value, the pitch amount and the roll amount that occur in the vehicle, and can adjust the forces of the force generation devices so that the estimated pitch amount and the estimated roll amount approach the target pitch amount and the target roll amount, respectively. With this configuration, the forces of the force generation devices are adjusted to forces obtained in consideration of not only the changes in the pitch amount and the roll amount due to the yaw moment generated based on the yaw moment command value, but also the changes in the pitch amount and the roll amount due to the pitch moment generated based on the yaw moment command value and the acceleration/deceleration command value. Consequently, in addition to the reduction of the promotion or the suppression of the roll due to the yaw moment generated based on the yaw moment command value, it is possible to reduce the promotion or the suppression of the pitch due to the pitch moment generated based on the yaw moment command value and the acceleration/deceleration command value. As a result, in the vehicle which generates the braking/driving forces through use of the braking/driving force controller based on the yaw moment command value and the acceleration/deceleration command value when the vehicle is steered, the roll/pitch combination can be maintained, and the steering stability can be increased.

As a fourth aspect, in the second aspect, the vehicle motion control apparatus further includes a yaw rate sensor configured to detect a yaw rate of the vehicle, and the control unit is configured to output the command value to each of the plurality of force generation devices based on a difference yaw rate being a difference between an estimated value of the yaw rate of the vehicle and a detection value of the yaw rate of the vehicle. According to the fourth aspect, it is possible to estimate whether the ground contact forces (grip forces) of the tires during the travel of the vehicle are within the normal region or the limit region from the difference yaw rate, and to adjust the forces of the force generation devices based on the estimated region. That is, the forces of the force generation devices can be adjusted in consideration of the state of the ground contact forces of the tires, and the steering stability can be increased also in this respect.

As a fifth aspect, in the second aspect, the control unit is configured to increase a roll control command when the steering is turned and to decrease the roll control command when the steering is returned in response to the yaw moment command value. According to the fifth aspect, the promotion of the roll at the time when the steering is turned can be reduced, and the suppression of the roll at the time when the steering is returned can be reduced.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-177675 filed on Sep. 27, 2019. All disclosed contents including Specification, Scope of Claims, Drawings, and Abstract of Japanese Patent Application No. 2019-177675 filed on Sep. 27, 2019 are incorporated herein by reference in their entirety.

REFERENCE SIGNS LIST 2 front wheel (wheel), 3 back wheel (wheel), 6, 9 damping force variable damper (force generation device), 11 yaw rate sensor, 15 brake hydraulic pressure control device (braking/driving force control means), 16 drive device (braking/driving force control means), 21, 63 controller (braking/driving force control means, force adjustable means, control unit, braking/driving force controller), 29 pitch control unit (target pitch amount calculation means), 30 roll suppression unit (target roll amount calculation means), 61 electromagnetic suspension (force generation device)

The invention claimed is:

1. A vehicle motion control apparatus to be used for a vehicle,
the vehicle including:
a braking force controller and/or a driving force controller configured to adjust braking force and/or driving force when the vehicle is steered; and
a plurality of force generation devices each of which is interposed between a vehicle body of the vehicle and one of a plurality of wheels, and is configured to adjust a force generated between the vehicle body and the one of the plurality of wheels,
the vehicle motion control apparatus comprising a control unit configured to adjust the force of each of the plurality of force generation devices,
wherein the control unit is configured to:
calculate, from a turn state of the vehicle body, a target roll amount being a target; and
estimate, based on a change rate of a lateral acceleration of the vehicle and a yaw moment command value for generating a yaw moment, a roll amount that occurs in the vehicle, and output, to each of the plurality of force generation devices, such a command value that the estimated roll amount approaches the target roll amount.

2. The vehicle motion control apparatus according claim 1, wherein the control unit is configured to:
calculate, from the turn state of the vehicle body, a target pitch amount; and
estimate a pitch amount that occurs in the vehicle, and output, to each of the plurality of force generation devices, such a command value that the estimated pitch amount approaches the target pitch amount.

3. The vehicle motion control apparatus according claim 2, wherein the control unit is configured to estimate, based on the change rate of the lateral acceleration of the vehicle, the pitch amount and the roll amount that occur in the vehicle through use of an acceleration command value and/or a deceleration command value for generating an acceleration and/or deceleration and the yaw moment command value, and the control unit is configured to output, to each of the plurality of force generation devices, such a command value that the estimated pitch amount and the estimated roll amount approach the target pitch amount and the target roll amount, respectively.

4. The vehicle motion control apparatus according claim 2, further comprising a yaw rate sensor configured to detect a yaw rate of the vehicle, wherein the control unit is configured to adjust the force of each of the plurality of force generation devices based on a difference yaw rate being a difference between an estimated value of the yaw rate of the vehicle and a detection value of the yaw rate of the vehicle.

5. The vehicle motion control apparatus according claim 2, wherein the control unit is configured to increase a roll control command when a steering of the vehicle is turned and to decrease the roll control command when the steering of the vehicle is returned in response to the yaw moment command value.

* * * * *